United States Patent [19]

Henderson et al.

[11] Patent Number: 4,685,643
[45] Date of Patent: Aug. 11, 1987

[54] NACELLE/WING ASSEMBLY WITH VORTEX CONTROL DEVICE

[75] Inventors: Michael L. Henderson, Seattle; Ralph B. Owen, Issaquah, both of Wash.

[73] Assignee: The Boeing Company, Seattle, Wash.

[21] Appl. No.: 521,039

[22] Filed: Aug. 4, 1983

[51] Int. Cl.⁴ .............................................. B64C 23/06
[52] U.S. Cl. ...................................... 244/199; 244/55
[58] Field of Search ................. 244/199, 200, 204, 91, 244/130, 55

[56] References Cited

U.S. PATENT DOCUMENTS

| 2,694,357 | 7/1950 | Lee . |
| 2,934,889 | 2/1956 | Poulos . |
| 3,153,319 | 10/1964 | Young et al. . |
| 3,370,810 | 2/1968 | Shevell et al. . |
| 3,471,107 | 10/1969 | Ornberg . |
| 3,578,264 | 5/1971 | Kuethe . |
| 3,664,455 | 5/1972 | Duvvuri . |
| 3,744,745 | 7/1973 | Kerker et al. ........................ 244/199 |
| 3,960,345 | 6/1976 | Lippert, Jr. . |
| 3,968,946 | 7/1976 | Cole . |
| 4,095,761 | 6/1978 | Anderson et al. . |
| 4,172,574 | 10/1979 | Spillman . |
| 4,243,188 | 1/1981 | DeBlois . |

FOREIGN PATENT DOCUMENTS

| 595877 | 4/1960 | Canada . |
| 833914 | 11/1938 | France . |
| 7537550 | 7/1976 | France . |
| 782950 | 9/1957 | United Kingdom ............. 244/34 A |
| 818188 | 8/1959 | United Kingdom . |
| 885093 | 12/1961 | United Kingdom . |

Primary Examiner—Galen L. Barefoot
Attorney, Agent, or Firm—Hughes & Cassidy

[57] ABSTRACT

In a nacelle and wing combination where a vortex is shed from a side surface portion of the nacelle and said vortex burst prematurely to reduce lift, the improvement comprising a vortex control device located in an upwash region along the side of the nacelle to cause said vortex to form in the critical vortex control region where boundary layer is relatively thin and local velocity is relatively high. This strengthens the vortex to inhibit vortex bursting at the burst location.

5 Claims, 12 Drawing Figures

NACELLE/WING ASSEMBLY WITH VORTEX CONTROL DEVICE

BACKGROUND OF THE INVENTION

1. Technical Field

The present invention relates to a nacelle and wing assembly for an aircraft, and more particularly to such an assembly with means to improve aerodynamic performance when operating at high angles of attack with the wing in a high lift configuration.

2. Background Art

It is quite common in present day aircraft designs to place the engine nacelle below the wing with the inlet of the nacelle being positioned forwardly of the leading edge of the wing. The design of modern, efficient transport aircraft has increasingly led to the use of high-bypass ratio engines which are considerably larger in diameter than equivalent low-bypass engines, but are highly desirable because of their significantly lower fuel consumption and reduced noise level. Forced by practical limits on landing gear, length and runway clearance, designers of new jet transport designs that employ such wing mounted, high-bypass ratio engines increasingly require much closer coupling of these larger engines to the wing than was the practice in the previous generation of transport designs.

Even with this close coupling of the nacelle, the nacelle/wing assembly is normally designed so that in cruise configuration the airflow around the nacelle causes relatively little disturbance to the airflow adjacent the wing. However, for the landing and/or takeoff mode, the wing generally has leading edge and trailing edge devices which are deployed to a high-lift position, and the aircraft is generally operating at a relatively high angle of attack. This results in increased interaction of the engine nacelle and wing flow fields, and particularly with closely coupled nacelles, this can degrade airplane performance. One of the most persistent and limiting problems relating to engine-wing interference is the reduction of maximum lift capability in the landing and take-off configurations. In the case of swept wing jet transports, this interference typically will result in the stall of the portion of the wing inboard of the nacelle at a much lower lift than would be the case with a smaller, less close-coupled engine. Occasionally, the interference will be severe enough that early stall will also be evident on the wing outboard of the nacelle; however, on swept wings typical of modern transport the inboard interference is generally much more severe.

A particularly damaging aspect of this problem is that the interference of this type is not affected by scale, so that while the lift producing capability of the wing alone typically increases with size (Reynold's number), the lift capability of the wing and nacelle remain constant (or is reduced) once interference related stall occurs. This makes small scale wind tunnel testing of such configurations most risky, significantly reducing the usefulness of one of the aerodynamicist's most powerful tools.

One prior art approach to identify the nature of the general problem of nacelle/wing flow interaction and provide an appropriate solution is disclosed in U.S. Pat. No. 3,744,745, Kerker et al, where there is shown a nacelle/wing assembly with a swept back wing and an engine nacelle mounted downwardly and forwardly of the wing leading edge. Mounted on the forward upper surface portion of the engine nacelle just behind the nacelle inlet are a pair of lift vanes. The text of the patent indicates that these vanes produce a downwash field between trailing vortices in the vicinity of the wing leading edge. It is further alleged that this field in turn reduces the high suction pressure peaks on the wing leading edge aft of the engine nacelle, tending, in turn, to delay the onset of airflow separation at the wing trailing edge forward of the flap. It is further stated that this delay in airflow separation permits the wing to generate more lift.

While it is generally known that vanes can be used to improve performance of the nacelle/wing assemblies in a high-lift mode of operation, these same vanes have an undesirable aspect in that for cruise mode of operation, they will normally tend to increase drag. Therefore, in general, it is desirable to size these vanes to alleviate the drag problem for cruise configuration, and yet to arrange the configuration and location of such devices to optimize their desirable effects in improving peak performance during the high lift/high angle of attack mode of operation.

However, the task of designing devices to modify the airflow about a nacelle/wing assembly is enormously complex. In the design of an aircraft, generally the overall configuration of the wing and nacelle are at a certain stage of the design fixed within certain limits. If an aerodynamicist had the luxury of unlimited time to test a particular nacelle/wing assembly in the wind tunnel, with unlimited budget, then he could embark on an extended experimental program of placing flow modifying devices of various configurations at various locations and eventually, by a lengthy process of trial and error, the overall design could be optimized. However, as a practical matter, where the entire airplane must be designed within certain budget limitations, such endless experimentation is not possible. Therefore, it becomes incumbent upon the aerodynamicist to analyze the performance and flow patterns of a given nacelle/wing assembly to determine which experimental avenues might be examined more advantageously to optimize performance. To conduct this analysis successfully with reasonable consistency requires not only an understanding of the aerodynamic phenomena which exist for a particular nacelle/wing assembly, but also what sort of flow modifying means might be employed successfully to be effective in resolving the problems associated with that particular phenomena.

In view of the foregoing, it is an object of the present invention to provide a nacelle/wing assembly with an appropriate flow control means, a method of making such an assembly, and a method of utilizing such an assembly, where, with the nacelle/wing assembly in a high lift, high angle of attack mode of operation, certain aerodynamic phenomena exists which are alleviated by effective use of certain flow modifying means.

SUMMARY OF THE INVENTION

The present invention is adapted to be used in a nacelle and wing combination, where the wing has a leading edge, a trailing edge, an upper surface and a lower surface. The nacelle has a front end and a forward portion extending forwardly of the wing leading edge. The nacelle has an outer surface, an upper crownline at an upper nacelle surface portion, a lower centerline at a lower middle surface portion, a first side portion and a second side portion. The wing has a cruise configuration and a high lift configuration where, in a high lift- /high angle of attack mode of operation, there are first and second upwash fields at the first and second side surface portions of the nacelle forwardly of the wing leading edge. The first upwash field has a lower inflow portion where flow enters the upwash field, and an upper outflow portion where flow leaves the upwash field.

There is created from flow from the first upwash field a critical vortex which is shed from the first side surface portion and captured in a low pressure field near the wing leading edge. The wing and nacelle combination are characterized in that in a wing and nacelle alone configuration, with the wing in the high lift configuration and in the high lift/high angle of attack mode of operation, the vortex forms at the vortex forming location to pass over the wing leading edge and then burst at a burst location as it passes into a high pressure area over said wing to cause separated flow over said wing at a separated flow area adjacent to and rearwardly of a location where said vortex burst.

The improvement of the present invention is a vortex control means located in a critical vortex control region. The critical region is in the first upwash field in a path of airflow which forms said critical vortex, and upstream in said path from said vortex forming location. The vortex control means is configured and positioned to cause the vortex to form in the critical vortex control region where boundary layer is relatively thin and local velocity is relatively high, relative to the vortex forming location, so as to strengthen the vortex to inhibit vortex bursting at said burst location.

Desirably, the vortex control device is an elongate fence having a lengthwise aerodynamically aligned generally along a lengthwise axis of the nacelle, and extending radially outwardly from the nacelle. The fence has a forward end portion positioned rearwardly of the front end of the nacelle.

In one embodiment, the nacelle is mounted below and forwardly of the wing leading edge, and the fence has a rear end portion forwardly of the wing leading edge. The forward end of the fence is positioned from the wing leading edge no greater than about ⅞ths of the distance from the wing leading edge to the front of the nacelle. The rear end of the fence is positioned from the wing leading edge a distance of at least as great as ¼ of the distance from the wing leading edge to the forward end of the nacelle.

Desirably, the fence is mounted on the nacelle side surface at a location between an upper radial line and a lower radial line from the center line of the nacelle, with the upper radial line forming an angle of about forty degrees with a vertical radial line extending to the crown of the nacelle, and the lower radial line forming an angle of about one hundred thirty five degrees with the vertical line extending through the crown of the nacelle.

In another arrangement, the nacelle is mounted forwardly and above the wing leading edge. In this arrangement, the forward end of the fence is positioned from the wing leading edge no greater than about 0.7 of the distance from the wing leading edge to the front end of the nacelle. The rear end of the fence is positioned no further rearwardly from the wing leading edge than a distance no greater than 0.3 of the distance from the wing leading edge to the forward end of the nacelle. The angular location of the fence is between an upper radial line and a lower radial line from a centerline of the nacelle, with the upper radial line forming an angle of about sixty degrees with a vertical radial line extending to a crownline of the nacelle, and the lower radial line forming an angle of about one hundred thirty five degrees from the vertical line extending through the crown of the nacelle.

The present invention is also directed to a method of designing and building a nacelle and wing combination. This method comprises first determining whether or not premature vortex burst is occurring with the wing and nacelle in a high lift high angle of attack mode of operation. This can be done by first determining operating characteristics of the wing alone in its high lift/high angle of attack mode of operation to obtain data relating to optimum wing performance without flow interference from the nacelle. Then the operating characteristics of the wing with the nacelle mounted thereto, in its high lift/high angle of attack mode of operation, is determined, and performance data is developed therefrom. The performance of operation of the wing and nacelle is compared against expected operating characteristics to determine if a difference exists relative to the operating characteristics such as lift, pitching moment and drag.

If it is determined that vortex burst is occurring, a vortex control device is applied to the first side surface portion of the nacelle in a critical contour region of the nacelle. The critical contour region is in the first upwash field in a path of airflow which forms the vortex which is prematurely bursting, and being upstream in said path from a vortex forming location at which said vortex would normally form.

Next there is determined an optimized location of the vortex control device to minimize vortex burst. Then dimensions and configurations of the vortex control device is optimized to produce the vortex of sufficient strength to give the wing proper operating characteristics and yet keep cruise drag to a reasonable minimum.

Other features of the present invention will become apparent from the following detailed description.

DESCRIPTION OF THE PREFERRED EMBODIMENTS

The implementation of the teachings of the present invention is dependent upon first an understanding of the flow phenomena associated with certain nacelle/wing configurations, and secondly an understanding of how certain flow modifying means can be used with such assemblies to alleviate the problems associated therewith.

Figure 1:
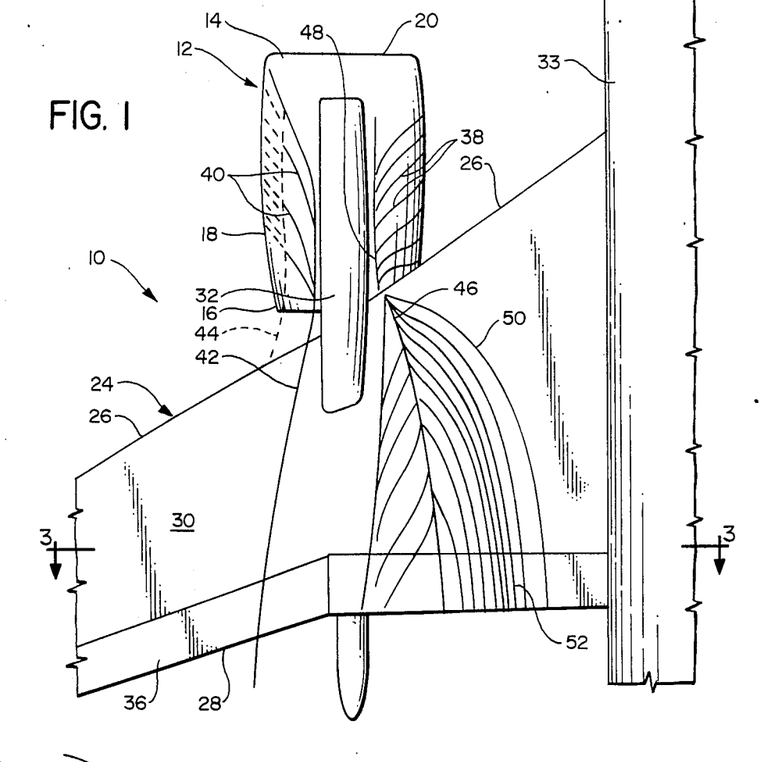
FIG. 1 is a top plan view of a nacelle/wing assembly illustrating a pattern in which vortices are formed from the upwash flow around the side surface portions of the nacelle.
Figure 2:
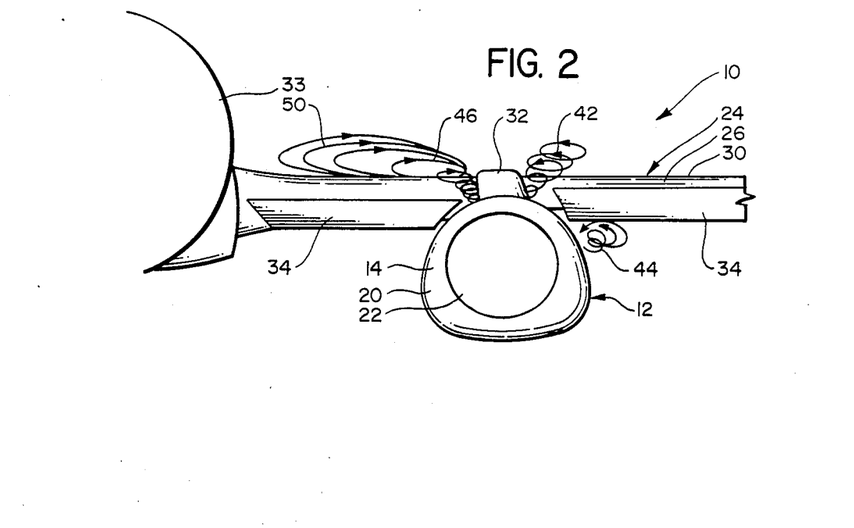
FIG. 2 is a front elevational view of the assembly of FIG. 1, illustrating formation of these vortices.
Figure 3:
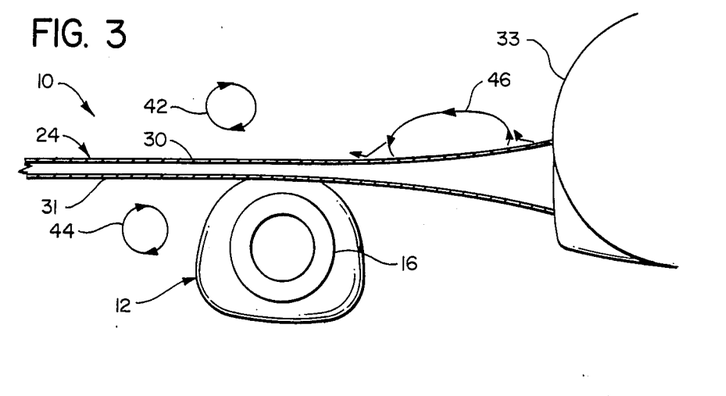
FIG. 3 is a rear elevational view of the assembly of FIGS. 1 and 2, illustrating generally this same pattern of vortices.

In FIGS. 1, 2 and 3, there is shown a nacelle/wing assembly 10 which is typical for many modern day jet transport planes. The nacelle 12 is or may be of conventional design, and it comprises an inlet end 14, an exhaust end 16 and a side wall providing an exterior circumferential side surface 18 extending from the inlet 14 to the exhaust end 16. At the inlet end 14, there is a circumferential inlet lip 20 which defines the inlet itself, designated 22.

The wing 24 has a leading edge 26, a trailing edge 28 and upper surface 30 and a lower surface 31. As is common with many modern day jet transports, the leading edge has a rearward and outboard sweep of approximately 10° to 40° from an axis transverse to the longitudinal axis of the aircraft fuselage 33. The nacelle 12 is mounted by a pylon 32 to the lower side of the wing 24 in a manner that the major part of the nacelle 12 is forward of the wing leading edge 26. The wing 24 has leading edge devices 34 and trailing edge devices 36 which have a stowed configuration for cruise mode, but which are extended for high lift mode of operation such as during takeoff and landing. Such leading and trailing edge devices 34 and 36 are illustrated somewhat schematically in FIGS. 1 and 2. In general, when these devices 34 and 36 are extended to the high lift position, the wing 24 is operated at a higher angle of attack, and there is a stronger upwash of flow upwardly and over the wing leading edge 26.

To understand the flow phenomena associated with the present invention, consideration is first given to the nacelle/wing assembly 10 operating in cruise mode. The wing is at a very low angle of attack, and the flow around the nacelle 12 passes beneath the wing 24, with little or no tendency to degrade the performance of the wing 24. However, in the takeoff and/or landing mode, with the leading and trailing edge devices 34 and 36 deployed to their high lift positions, and with the wing 24 operating at a higher angle of attack, the nacelle 12 is positioned in an intense upwash field near the leading edge 26 of the wing 24, with the nacelle 12 itself producing a considerable amount of lift and therefore strong vortices (which must be shed from any lifting surface). These vortices are shed from both sides of the nacelle 12 and may be captured, if the nacelle is close enough to the wing by the low pressure field near the wing leading edge 26. Once captured, the vortex is forced to attach itself to the wing surface and acts as a massive vortex generator, thinning the boundary layer where vortex velocities are high and thickening it where the vortex streamlines diverge from the wing surface. The effects of this vortex--boundary layer interaction is generally favorable in that the thinning of the boundary layer allows it to withstand more severe adverse pressure gradients before separating. If strong enough, the vortex shed by a large close-coupled nacelle will also modify the pressure distribution locally on the wing in a generally favorable way, usually reducing the local pressure gradients at a given wing lift level. This beneficial interaction exists as long as the vortex shed from the inboard side of the nacelle remains intact and attached to the wing 24.

These flow phenomena are illustrated in FIGS. 1 through 3. In FIG. 1, there are shown the inboard and outboard streamlines 38 and 40, respectively, which travel upwardly and somewhat rearwardly around the inboard and outboard sides of the nacelle, this flow being called "upwash". As indicated previously, the flow upwardly over the outboard side of the nacelle is less critical. This outboard airflow 40 upwardly around the nacelle results in a vortex, indicated at 42 generated at the outboard location of the pylon. In the illustrations of FIGS. 1 through 3, this vortex 42 is shown as passing over the leading edge 26 and passes above the flow field immediately adjacent the wing. There is also shown a lower vortex 44 which passes beneath the wing on the outboard side of the nacelle 12. Generally, neither of these vortices 42 and 44 have any substantial degrading effect on wing performance.

However, there is more of a problem with the vortex 46 which can be called a "critical vortex" and which is forced to exist on the inboard side of the nacelle 12. As illustrated in FIG. 1, this vortex 46 forms in the intense upwash field near the wing leading edge 26 adjacent the inboard nacelle separation line at the nacelle pylon intersection, indicated at 48. This vortex 46 is "captured" in the low pressure field that exists at the wing leading edge 26 on the inboard side of the pylon 32 and attaches itself to the wing upper surface 30. If the vortex were to remain intact as it passes over the wing upper surface 30 (i.e. if the vortex 46 were not to burst), then it might assume a configuration as generally illustrated in FIGS. 1 through 3. The vortex would expand in an inboard direction, as indicated at 50 and finally pass over the trailing edge of the wing in the general area indicated at 52.

There is a problem, however, in that in the high lift/high angle of attack configuration, the vortex 46 will undergo a violent increase in pressure as it flows from the location of the leading edge 26 further rearwardly over the wing upper surface 30. When a vortex passes into an increasing pressure field, the axial velocity in its viscus core is retarded. This has two serious consequences: a) the vortex must expand due to its increasing core pressure, and b) the stability of the vortex, which is strongly related to its axial velocity, is severely reduced. If the pressure gradients imposed on the vortex are strong enough, its stability will be reduced beyond a critical point and the now swollen vortex will burst (i.e. there will be a significant transfer of ordered, rotational motion to turbulent motion in the vortex), causing the area of the wing to which the vortex was attached to separate violently. It has been discovered through analysis of diagnostic wind tunnel and flight testing that vortex bursting is, with certain nacelle/wing assemblies, the key aerodynamic phenomenon involved in the interference-induced early stall of the wing inboard of the nacelle.

Figure 4:
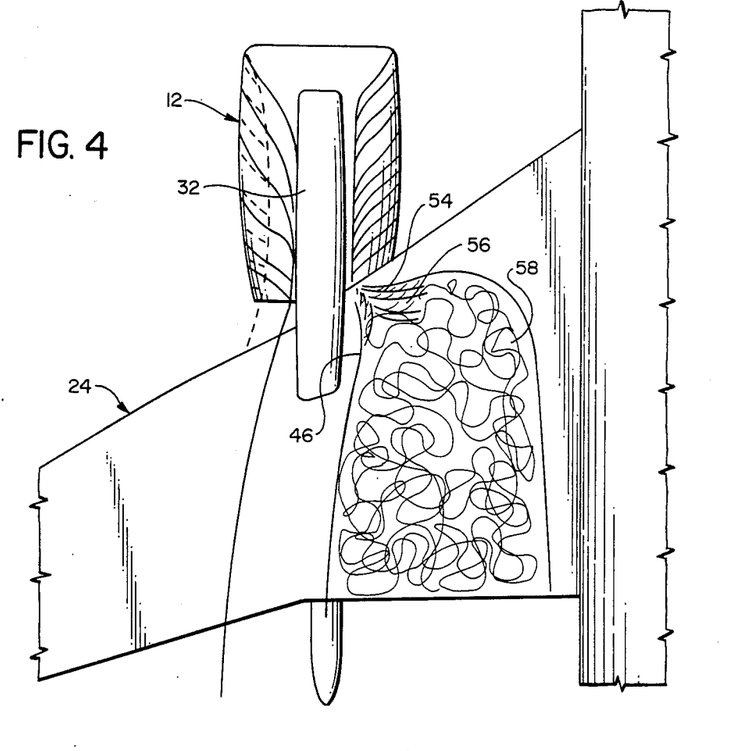
FIG. 4 is a top plan view similar to FIG. 1, but showing a flow pattern resulting from vortex burst over the upper inboard portion of the wing.

This vortex bursting is illustrated in FIG. 4, where it can be seen that the inboard vortex 46 undergoes rapid expansion at the area indicated at 54. The vortex burst can occur generally at the area indicated at 56, and this results in turbulent flow over a large portion of the wing upper surface inboard of the nacelle 12. This area of turbulent flow is indicated generally at 58 in FIG. 4.

Figure 5:
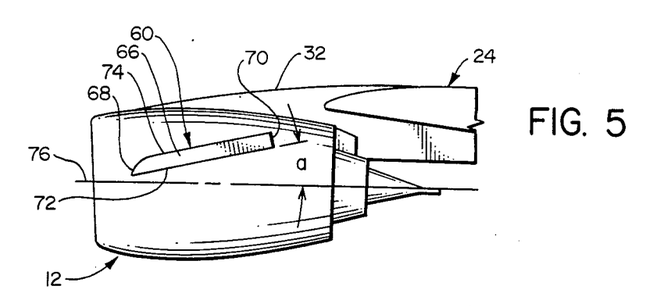
FIG. 5 is a side elevational view of a nacelle/wing assembly with the vortex control device of the present invention.
Figure 6:
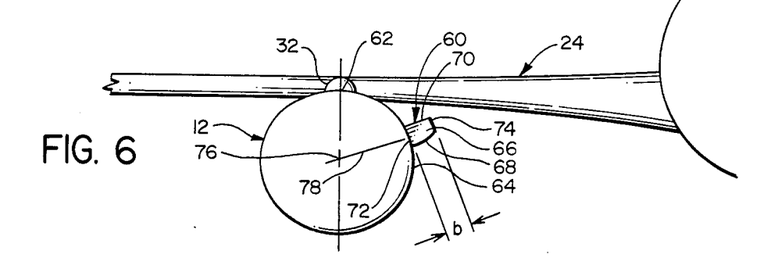
FIG. 6 is a front elevational view of the assembly of FIG. 5 with the vortex control device.

To alleviate this problem of vortex bursting, a vortex control device 60 is installed on the inboard side of the nacelle. A typical arrangement of such a device is illustrated in FIGS. 5 and 6. (For ease of description, since the forward swept portion of the wing is the portion of the wing inboard of the nacelle 12, the location of the vortex control device 60 will be referred to as being at an inboard location, it being understood that if the wing 24 were swept in the opposite direction, the device 46 would be on the outboard side of the nacelle 12.)

The vortex control device 60 is sized and positioned to cause early separation of the near vertical flow (indicated at 38) on the inboard side of the nacelle 12. This causes the inboard nacelle vortex 46 to be shed from the device 60 rather than from the top of the nacelle strut junction 48. Forcing the nacelle vortex 46 to separate from a properly placed and sized vortex control device 60 delays vortex burst in two ways. First, causing the nacelle vortex to separate farther from the nacelle pylon intersection 48, the vortex is formed at a location where the boundary layer is relatively thin and the local velocity of the upwardly and rearwardly travelling airstream is relatively high. This appears to have the effect of increasing the axial velocity in the vortex core (due to the thinner boundary layer at separation) relative to its circumferential velocity by forcing at least part of the vortex to form away from the wing nacelle pylon junction 48 where there is relatively lower local velocity and thicker boundary layer. The increased axial velocity in the vortex's core, when the vortex is formed, allows the vortex 46 to withstand greater adverse pressure gradients before the axial velocity in its core is retarded to the critical level of bursting, thus allowing the wing to attain higher lift levels before vortex bursting causes stall.

Second, if the vortex control device is properly positioned, it will cause the nacelle vortex 46 to attach to the wing further aft than would otherwise be the case or in some instances to pass completely over the wing. This frees the vortex 46, to some degree, from the very sharp suction peaks and pressure gradients near the leading edge of the wing. As a consequence, vortex expansion and retardation of the axial velocity in the core are reduced at a given wing lift level. The wing is then allowed to achieve a higher lift level before the pressure gradients imposed on the relocated vortex becomes strong enough to again cause bursting and the resultant wing separation. Properly applied, the control device 60 allows remarkable control over the nacelle vortex 46 and enables the designer to delay inboard vortex burst stall until the rest of the wing 24 has achieved its performance potential. The precise location, configuration and sizing of the vortex control device 60 will vary somewhat depending upon the specific configuration and arrangement of the nacelle/wing assembly 10. However, by following a proper procedure of testing and analysis, these factors can be established within reasonable limits without an inordinate amount of trial and error experimentation.

To perform such analysis, let it be assumed that the design of the nacelle 12 and wing 24 for a particular airplane design has been established within reasonably defined limits. The first step would be to test the wing by itself (i.e. without the nacelle) in the wind tunnel in its high lift/high angle of attack mode of operation. This will yield data relating to the optimum performance of the wing (i.e. performance without flow interference from the nacelle). Then this same wing is tested in the wind tunnel with the engine nacelle mounted to the wing. Since the wind tunnel model is a scaled down version, it can be expected that certain performance characteristics would improve when this same configuration is scaled up to the full size. To make the data more accurate, it is desirable to modify those parts of the wing that would be expected to improve with scaling up. This can be done, for example, by changing the configuration of the leading edge contour to improve lift to a level which would be expected for the scaled up model. Further, boundary layer control could be utilized to simulate more closely the expected performance of the full size nacelle/wing assembly. The nacelle/wing assembly is analysed with regard to such operating characteristics as lift, pitching moment, and drag.

It can be expected that the addition of the nacelle to the wing in the wind tunnel testing will cause some modification in the operating characteristics of the wing in its high lift/high angle of attack mode of operation. However, through techniques well known to the aerodynamacist, it is possible to predict what would be reasonably expected modifications in the operating characteristics of the wing. If the nacelle/wing assembly performs satisfactorily within such limits, then quite likely premature vortex bursting is not a significant problem during the high lift/high angle of attack mode of operation for that particular assembly. However, certain more significant changes in operating characteristics would indicate that premature vortex bursting is a problem. For example, if the pitching moment were to change significantly before the expected wing stall condition so that the aircraft would pitch downwardly, then it can be deduced that there is a good possibility that the inboard portion of the wing is stalling prematurely, with premature vortex bursting being the source of this problem.

Under these circumstances, the next step would be to further test the nacelle/wing assembly in the wind tunnel using conventional flow visualization techniques to determine the flow patterns upwardly around the nacelle and over the wing. Such techniques are well known in the art, and can be accomplished, for example by placing different colored ink at various locations on the nacelle and wing and later determining where the stream flow carries these various portions of ink. Another technique is to suspend koalin in kerosene and paint the kerosene/koalin mixture over certain areas of the nacelle/wing assembly. As the kerosene evaporates, the koalin becomes visable on the wing in a manner to disclose the flow pattern. The flow visualization testing can be used to disclose not only the flow pattern upwardly over the inboard side of the nacelle, but also will identify whether the vortex bursting is occurring in the manner described previously herein.

If it is determined that premature vortex bursting is the problem, then the next step would be to apply a vortex control device, such as that shown at 60, to the inboard portion of the upper nacelle surface. Initially, the device 60 is selected in a deliberately oversized configuration to generate a vortex which would likely be stronger than what it is estimated would actually be needed. The device 60 is located so that it intercepts the streamlines 38 which flow into the inboard side vortex 46 that is formed, and the assembly is tested with the control device 60 at various vertical locations, until the optimum vertical location along the side of the nacelle is ascertained. If the positioning of the device 60 is too high on the nacelle (i.e. too close to the crown 62, the vortex is formed at a location where the boundary layer is thicker and the air has lower velocity, so that the strength of the vortex is diminished. On the other hand, if the placement of the device 60 is too far downwardly along the side of the nacelle, the streamlines 38 along the inboard side of the nacelle may reattach to the nacelle above the device 60 and then form the vortex at the intersection 48 of the nacelle 12 and pylon 32. On some configurations, typically those in which the nacelle is level with or above the plane of the wing, a properly positioned vortex control device will cause the nacelle vortex to attach to the wing further rearwardly than would otherwise be the case, or to pass completely over the wing at a given lift level. This frees the vortex, to some degree, from the very sharp suction peaks and pressure gradients near the leading edge of the wing. As a consequence, vortex expansion and retardation of the axial velocity in the core are reduced at a given wing lift level. The wing is then allowed to achieve a higher lift level before the pressure gradients imposed on the relocated vortex becomes strong enough to again cause bursting and the resultant wing separation.

The optimum location of the device 60 can generally be ascertained by examining the pitching moment of the aircraft model. With a very strong vortex being formed by the device 60, the flow over the inboard portion of the wing will likely remain attached at angles of attack higher than that at which stall would occur at the outboard location of the wing, thus causing pitch up. In the end configuration, this upward pitching moment at such high angles of attack would be undesirable, but this is done only as an intermediate step in the testing procedure.

Once the optimized location of the device 60 is ascertained, then its dimensions can be reduced to minimize drag for cruise configuration and yet produce a vortex of sufficient strength to give the wing proper operating characteristics. To explain this more fully, the wing is designed so that it will begin to stall at a certain angle of attack. Desirable, the initiation of stall would be fairly uniform along the length of the wing to avoid excessive pitch-up or pitch-down at near stall condition. By sizing the vortex control device 60 to produce a vortex of the proper strength, the vortex bursting can be delayed until the wing 24 is reaching the near stall condition.

Figure 7:
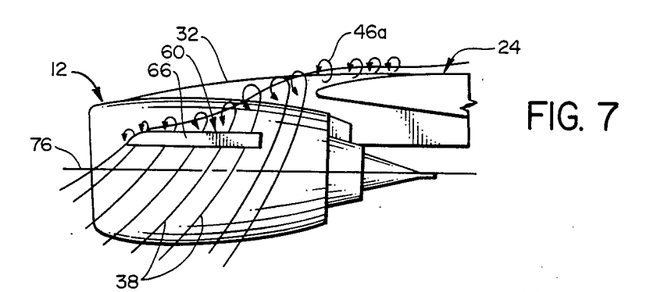
FIG. 7 is a side elevational view similar to FIG. 5, showing the vortex control device having a somewhat different alignment, and further illustrating the flow pattern of the vortex.
Figure 8:
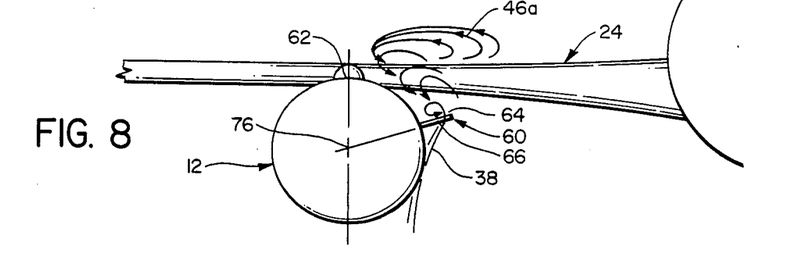
FIG. 8 is a front elevational view of the assembly of FIG. 7, again showing the pattern of vortex flow.

The manner in which the vortex control device 60 operates is illustrated in FIGS. 7 and 8. It can be seen that the streamlines 38 intersect the device 60 at a vertical location which is moderately above a mid-height location 64 at the side of the nacelle 12. The vortex formed by the device 60 is designated 46a to distinguish it from the vortex 46 which would otherwise be formed at the intersection 48 of the nacelle 12 with the pylon 32. It is to be emphasized that in the present invention, this device 60 is regarded as a vortex control device, as opposed to a vortex generating device. In other words, an inboard vortex 46 will be formed from the nacelle in any event in the high-lift/high angle of attack mode of operation. The present device 62 either causes this vortex to form at a location further down along the side surface of the nacelle 12 so that the vortex is formed with the desired strength and at the desired location, or to cause the vortex shed by the nacelle to be displaced relative to the local wing flow field so as to delay attachment of the vortex to the wing surface. Also, it is to be understood that by so controlling the vortex, vortex bursting is not totally eradicated for all conditions. Rather, the vortex bursting is delayed so that it will not occur until the other portions of the wing are beginning to stall, thus insuring that the performance along the length of the wing in the near stall condition is relatively uniform.

In the particular configuration shown herein, the vortex control device 60 comprises an elongate fence 66 having a forward end 68, a rear end 70, a radially inward edge 72 by which it is joined to the inboard side surface of the nacelle 12, and a radially outward edge 74. The fence 66 is generally aligned with the lengthwise axis 76 of the nacelle 12. In the particular configuration shown herein, it has a moderately downward slant in a forward direction of approximately ten degrees, as indicated at "a" in FIG. 5. In FIGS. 7 and 8, the fence 66 is shown substantially parallel to the center axis 76 of the nacelle 12. This is done to illustrate that there can be variations in the alignment of the fence 66 to optimize performance for particular conditions.

The width dimension of the fence 66 (i.e. the dimension parallel with the radius 78 from the center axis 76 of the nacelle 12, indicated at "b" in FIG. 6, is desirably made as small as possible to reduce aerodynamic drag during cruise mode. However, the width dimension must be made sufficiently large so that the vortex shed at the location of the fence 66 is sufficiently strong. In general, this width dimension would be between about 5% to 20% of the radius of the nacelle 12 at its maximum width dimension. The thickness of the fence 66 is made as thin as possible to reduce aerodynamic drag, but must have sufficient thickness so as to have adequate structural strength.

Figure 9:
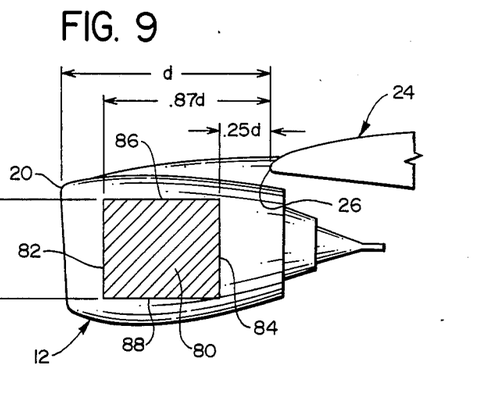
FIG. 9 is a side elevational view of a nacelle/wing assembly where the nacelle is mounted below and forwardly of the wing leading edge, this view showing the critical vortex control region of the present invention.
Figure 10:
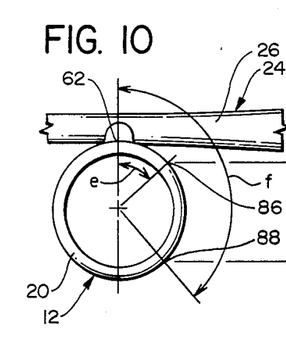
FIG. 10 is a front elevational view of the assembly of FIG. 9, again showing the critical vortex control region.

With regard to the location of the fence 66, it should be located in what can be termed a "critical vortex control region", which is the general location for the vortex control device 60 to optimize performance in accordance with the criteria outlined previously herein. With reference to FIGS. 9 and 10, where the nacelle 12 is shown as an underwing mounted nacelle, extending forwardly from the wing leading edge, the general outer limits of this critical vortex control region are indicated in the shaded area 80. To locate the forward and rear limits of this region, there is a given lengthwise dimension extending from the wing leading edge 24 to the forward end 20 which is at the upper portion of the inlet lip of the nacelle 12, this dimension being indicated at "d" in FIG. 9. The forward boundary 82 of the region 80 would normally be positioned forwardly of the wing leading edge 24 a distance no greater than about 0.87d (i.e. no greater than about ⅞ths the distance from the leading edge 24 to the forward lip 20). The rear limit 84 of the area 80 would normally be spaced at least 0.25d forwardly of the wing leading edge 24 (i.e. at least one-quarter of the distance from the leading edge 24 to the nacelle forward lip 20).

The upper limit 86 of the region 80 would coincide generally with a lengthwise line coinciding with a radius extending outwardly from the nacelle center line at an angle of about forty degrees from the crown line 64 (indicated at "e" in FIG. 10). The lower limit 88 would coincide with a lengthwise line which is coincident with a radius drawn from the center axis 76 at an angle of one hundred thirty five degrees from the crown line 64 (indicated at "f" in FIG. 10).

Normally, the leading edge 68 of the fence 66 would be positioned no further forwardly than the forward boundary 82, while the rear end 70 would be no further rearward than the rear boundary 84. Further, the fence 66 would be within the confines of the upper and lower lines 86 and 88, respectively. It is to be understood that this critical vortex control region 80 can be defined only generally, and the limiting lines 82-88 are by no means considered to be sharp demarkation lines. However, it can be stated generally that for the nacelle wing configuration shown in FIGS. 9 and 10, these would be the outer limits. The length of the fence 66 would generally be no greater than the total lengthwise dimension of the region 80 (i.e. from line 82 to 84), and the fence 66 would generally have a lengthwise dimension at least 1/5th of the total length of the region 80.

Figure 11:
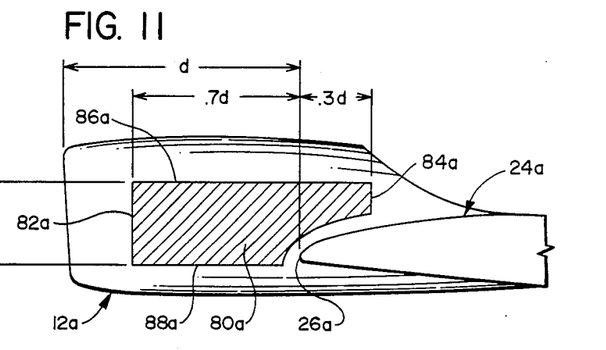
FIG. 11 is a side elevational view of a nacelle/wing assembly where there is an overwing mounted nacelle, and showing the critical vortex control region.
Figure 12:
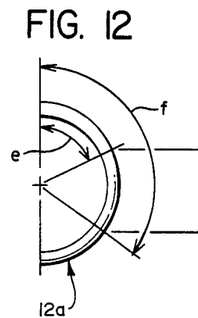
FIG. 12 is a front elevational view of the assembly of FIG. 11, again showing the critical vortex control region.

Reference is now made to FIGS. 11 and 12 which show a nacelle wing combination where there is a nacelle 12a and a wing 24a. This nacelle 12a is shown somewhat semi-schematically, and it can be seen to be mounted at a location above and forwardly of the wing 24a. Since the general problem of vortex control and the use of the vortex control device 60 of the present invention to delay or otherwise alleviate the effects of vortex burst, have been described previously herein relative to the underwing mounting as well as the overwing mounting, this will not be described in detail at this point. However, the critical vortex control region is changed somewhat for the overwing configuration, and this region is indicated in the shaded area at 80a. The forward and rear, as well as the upper and lower regions of this region 80a are given designations 82a, 84a, 86a, and 88a, respectively, and the location of these relative to the distance "d" from the wing leading edge 24a to the forward inlet lip end 20a are given in FIGS. 11 and 12. The forward boundary 82a is about 0.7d forwardly of the leading edge 24a, while the rear limit 84a is about 0.3d rearwardly of the wing leading edge 24a. The angle "e" as shown in FIG. 12 is about sixty degrees from the crown line, while the angle "f" as shown in FIG. 12 is about one hundred thirty five degrees from the crown line.

We claim:

1. A method of designing and constructing a nacelle and wing combination, where said wing has a leading edge, a trailing edge, an upper surface and a lower surface, said nacelle having a front end and a forward portion extending forwardly of said wing leading edge, said nacelle having an outer surface, an upper crown line at an upper middle nacelle surface portion, a lower center line at a lower middle surface portion, a first side surface portion and a second side surface portion, said wing having a cruise configuration and a high lift configuration where in a high lift/high angle of attach mode of operation, there are first and second upwash fields at the first and second side surface portions of a nacelle forwardly of the wing leading edge, said first upwash field having a lower inflow portion where flow enters said upwash field, and an upper outflow portion where flow leaves said upwash field, and there is created from the flow from the first upwash field a critical vortex which is formed at a vortex forming location and which is shed from the first side surface portion to travel over the wing leading edge, said method comprising:
   a. determining existence of premature vortex bursting, which is a condition where said vortex is bursting above a forward portion of the upper surface of the wing rearwardly of the leading edge of the wing, with said wing and nacelle in the high lift/high angle of attack mode of operation:
   b. under circumstances where said premature vortex bursting is occurring, applying a vortex control device to said first side surface portion of said nacelle at a location upstream of said vortex forming location in said first upwash field in a path of airflow which forms said vortex;
   c. determining an optimized location of said vortex control device to minimize vortex burst;
   d. optimizing dimensions and configurations of said vortex control device to produce said vortex at sufficient strength to give the wing desired predetermined operating characteristics and minimize cruise drag; and
   e. constructing a full scale nacelle and wing combination with said vortex control device having said optimized dimensions and configuration relative to said nacelle and being mounted to said nacelle at said optimized location.

2. The method as recited in claim 1, wherein a vortex control device of a greater size is applied to said first side portion to generate a vortex which is relatively strong and then reducing the size of the vortex control device to said optimized dimensions to generate a vortex which is relatively less strong.

3. The method as recited in claim 2, further comprising reducing dimensions of the vortex control device after optimized location is obtained in a manner that pitching moment remains properly balanced.

4. The method as recited in claim 1, further comprising sizing and arranging the vortex control device so that with the wing operating in near stall condition, initiation of stall is substantially uniform along the length of the wing to avoid excessive pitch-up or pitch-down at near stall condition, with any vortex bursting being delayed until the wing is reaching near stall condition.

5. A nacelle and wing combination made in accordance with the method recited in any one of claims 2, 3 or 4.

* * * * *